(12) United States Patent
Henry et al.

(10) Patent No.: US 10,298,445 B2
(45) Date of Patent: May 21, 2019

(54) METHOD FOR DYNAMIC ADJUSTMENT OF A LEVEL OF VERBOSITY OF A COMPONENT OF A COMMUNICATIONS NETWORK (71) Applicant: CASSIDIAN CYBERSECURITY SAS, Elancourt (FR)

(72) Inventors: Manuel Henry, Tilly (FR); Valerian Rossigneux, Montigny le Bretonneux (FR)

(73) Assignee: CASSIDIAN CYBERSECURITY SAS, Elancourt (FR)

( * ) Notice: Subject to any disclaimer, the term of this patent is extended or adjusted under 35 U.S.C. 154(b) by 213 days.

(21) Appl. No.: 15/518,055

(22) PCT Filed: Oct. 9, 2015

(86) PCT No.: PCT/FR2015/052727
§ 371 (c)(1),
(2) Date: Apr. 10, 2017

(87) PCT Pub. No.: WO2016/055750
PCT Pub. Date: Apr. 14, 2016

(65) Prior Publication Data
US 2017/0310537 A1 Oct. 26, 2017

(30) Foreign Application Priority Data
Oct. 10, 2014 (FR) ..................................... 14 59718

(51) Int. Cl.
G06F 15/173 (2006.01)
H04L 12/24 (2006.01)
(Continued)

(52) U.S. Cl.
CPC ........ *H04L 41/069* (2013.01); *G06F 11/3093* (2013.01); *H04L 41/0681* (2013.01); *H04L 63/1425* (2013.01); *H04L 41/06* (2013.01)

(58) Field of Classification Search
CPC .. G06F 11/3093; H04L 41/06; H04L 41/0681; H04L 41/069; H04L 63/1425
(Continued)

(56) References Cited

U.S. PATENT DOCUMENTS

2002/0198983 A1 12/2002 Ullmann et al.
2004/0049698 A1 3/2004 Ott et al.
2006/0206941 A1 9/2006 Collins et al.

OTHER PUBLICATIONS

International Search Report as issued in International Patent Application No. PCT/FR2015/052727, dated Jan. 15, 2016.

*Primary Examiner* — Phuoc H Nguyen
(74) *Attorney, Agent, or Firm* — Pillsbury Winthrop Shaw Pittman LLP (57) ABSTRACT A method for dynamic management of a first level of verbosity of a component defined in a data network, the data network having a control center, each component allowing the execution of tasks and including a security management configuration associating a status message, forming a log, with the execution of a task of the component, each log associated with a task indicating an event and having a local level, the control center allowing the collection of a set of logs to supervise the network, the method including: detecting a stimulus by a control center; determining a component associated with the stimulus detected by the control center; modifying the first level of verbosity of the component to a second level of verbosity during a first given period, the modification being launched by generating a supervision command by the control center, the second level of verbosity being defined according to the stimulus.

14 Claims, 4 Drawing Sheets (51) Int. Cl.
*G06F 11/30* (2006.01)
*H04L 29/06* (2006.01)

(58) Field of Classification Search
USPC .......................................................... 709/225
See application file for complete search history.

METHOD FOR DYNAMIC ADJUSTMENT OF A LEVEL OF VERBOSITY OF A COMPONENT OF A COMMUNICATIONS NETWORK

CROSS-REFERENCE TO RELATED APPLICATIONS

This is the U.S. National Stage of PCT/FR2015/052727, filed Oct. 9, 2015, which in turn claims priority to French Patent Application No. 1459718, filed Oct. 10, 2014, the entire contents of all applications are incorporated herein by reference in their entireties.

FIELD

The field of the invention relates to the processing of supervision data and its volume in information systems based on a network architecture.

STATE OF THE ART

Information systems are becoming increasingly complex and using increasingly small data networks. These networks must share various data protocols, organise data transfers within various software architectures, put the data into order and prioritise the transmitted flows. Data networks also include ever greater numbers of connected objects and various hardware resources, making management of the network more complex.

Against this background information systems must also protect themselves against attacks from outside the network, hacking and viruses which may disrupt satisfactory operation of the network.

A solution which is currently deployed in information systems is a supervision tool based on collection of control and network supervision data. These messages enable a control module to be informed of the network's status and activity, where this module is also called a supervision centre or control centre. The network's status and activity include supervision of the status and of the activity of the connected equipment, of the accessible applications, of the online users, and also of their rights over the various components in the network, where a component can be a device or an application.

Each event or change of status of a component or of a user's action with regard to its or their rights generates at least one supervision message which includes at least one log and one event. The messages can include various levels of importance depending on the event which has occurred or the modified status. The control module includes a tool for managing the received supervision messages to process the information in prioritised fashion. Certain actions are in fact activated within the control module when it is observed that a combination of messages has been received, for example a series of attacks made by a hacker will generate various supervision messages over a given time window. The supervision messages must therefore be processed on a case-by-case basis, but also certain correlations of received messages must also be processed.

One of the problems currently experienced in complex networks accessible to a large number of users, containing a large number of connected devices, using many applications, with complex rights management, is when a large number of supervision messages is generated within the network. The volume of supervision data being reported to the control module then becomes difficult to process and to store. In a large volume of data requiring processing the operations to correlate the received supervision messages follow processing rules enabling network anomalies to be detected. These rules are implemented in the control module. When a large volume of messages is generated and transmitted to the control module, in addition to the problem of storage these may also cause a problem of resource availability for processing these supervision messages. Finally, another problem of transmission of a large volume of data across the network consists of a risk of saturation, and therefore a risk that certain components will stop, or of other unforeseeable sporadic operations occurring whilst a user is working.

As a result, supervision levels can be defined which attempt to define which supervision messages are reported to the control module, and which messages are not reported; these supervision messages are more commonly called "verbosity levels". Different verbosity levels can thus be defined according to the devices which are connected, the category of online users, and their rights, or indeed the category of certain more or less sensitive applications. Verbosity levels are generally defined in the deployed components. However, a secondary problem of this solution is that by applying common rules to a set of components or users the system is made less resilient from the standpoint of security and of certain types of attack, which become more difficult to detect, due to the fact that fewer supervision messages are being generated. This solution has the disadvantage that it lays down a compromise between the level of security required for supervision and control of the network, and satisfactory operation of the network.

A second problem caused applying supervision levels is that the levels are not appropriate for certain types of complex attacks which may occur. Indeed, certain types of attack are highly targeted, and occur over long periods of time, making them difficult to detect, Reducing a verbosity level may enable attacks lost in the background "noise" to be threatening for the network, without any possibility of prevention.

A third problem is the occupation of the bandwidth of the supervision messages transmitted by the devices, including devices connected by means of a narrow band. Typically, mobile devices of the "professional communication radio" type have a limited frequency band, which is mainly reserved for the transmission of useful data, called "operational data". This operational data should not be excessively adversely affected by supervision data transmissions which restrict the bandwidth.

SUMMARY OF THE INVENTION

The invention seeks to resolve the above-mentioned disadvantages.

One object of the invention relates to a method for dynamic management of at least a first verbosity level of at least one component defined in a data network, where said data network has a control centre, where each component allows execution of a set of tasks, and including a security management configuration associating a status message, called a log, with the execution of a task of said component, where each log associated with a task indicates at least one event and has a local level, where the control centre collects a set of logs for supervision of said network, and where said method includes:
  detection of a stimulus by a control centre;
  determination of at least one component associated with the stimulus detected by the control centre;

a first change of the first verbosity level of said component to a second verbosity level during a first given period, where said change is effected by the control centre generating a supervision command, and where the second verbosity level is defined according to the stimulus.

The local level of a task may be an integer or a number which may be configured or set in each component. The local level may advantageously be defined with a scale of values different to the verbosity levels, in order to make effective comparisons.

According to one implementation, after the first period has elapsed the method includes:
  a second change of the second verbosity level of the first component, to return to the first verbosity level.

According to one implementation the control centre includes a memory which stores the following:
  a set of network components, and for each component a first verbosity level associated with it;
  a set of investigation scenarios including predefined stimuli, where each predefined stimulus is associated with a recommended verbosity level.

According to one implementation the value of the second verbosity level is generated on the basis of:
  an investigation scenario identified according to a determined stimulus, where a determined stimulus includes at least one event identified by a received log;
  a performance value of a component associated with a log used in determining the stimulus.

According to one implementation the stimulus is the result of:
  at least one operation to correlate a set of events occurring in a given time window, reported by generating a set of logs of at least one component;
  a comparison of the result of the operation to correlate collected logs with all the investigation scenarios stored in the control centre.

According to one implementation, an investigation scenario and a correlation operation resulting in the determination of a stimulus take the following into account:
  a plurality of events identified by logs occurring over a given period;
  one or a plurality of component(s) associated with at least one event;
  an identification of at least one device.

According to one implementation at least one agent storing a set of components is configured to collect the logs generated from a plurality of components, where the agent transmits the collected logs to the control centre.

According to one implementation a log includes at least one of the following elements:
  a date when an event relating to the executed task occurred;
  an identifier of at least one user;
  an identifier of at least one component;
  a category or criticality.

According to one implementation a log is generated by task when its local level is higher than the component's verbosity level.

According to one implementation each generated log is stored in a local file of the component or transmitted to an agent or transmitted to the network's control centre.

According to one implementation, the second verbosity level of the component is between the first verbosity level of the component and the maximum possible verbosity level of a component, where the second verbosity level depends on the determined stimulus.

According to one implementation a component is an application component in the following list:
  a driver;
  a local agent of a computer hardware device;
  a database;
  a business application;
  an operating system;
  a network application;
  a firmware module;
  an anti-virus module;
  a firewall;
  an agent of a hardware component.

According to one implementation an event which may intervene and generate a log is included in the following list:
  a command given by a function of a given component;
  generation of a result of a function executed following a command;
  access to, opening, closure or modification of a given file or folder;
  a determined number of simultaneous connections to a component;
  a given query with a given IP address;
  access to a given interface of the component;
  a reboot of the component;
  disconnection of the component.

One advantage of the method of the invention is that it modifies the verbosity level of a component of a network on the basis of dynamic data and its context. The major benefit is that it reduces log transmissions overloading the network, whilst maintaining a level of supervision and satisfactory network security.

Another advantage is that it provides an automatic method which can switch into a mode when it detects a stimulus, and return to the default mode automatically, for example after a certain time period. This results in time savings and simpler management for the supervisor.

Another advantage of the method of the invention is that it enables complex investigation scenarios to be defined which are predefined and pre-recorded, and which can be configured by an operator depending on the detected stimuli. These can then be edited and modified as applicable.

Another advantage of the invention is that it automatically takes into account the performance levels of the components and of the network hardware. Thus, not only does the method of the invention enable the volume of data transiting over the network to be reduced, but also the use of each component in the network, maintaining their performance level.

Another advantage of the invention is that it makes calculations on the occurrence of various occurring events in order to begin a specific investigation scenario.

Another object of the invention relates to a control centre controlling a verbosity level of at least one component of a data network, where the control centre includes:
  a network interface to log into a data network and to collect data transmitted by at least one component in the network;
  a memory allowing storage of:
    a set of stored components in the data network, where each component enables execution of a set of tasks, where each task may generate a log in the network, where each log corresponds to a given event;
    predefined stimuli, where each stimulus corresponds to a least one event, or to the result of correlations of events occurring within a time window;
    investigation scenarios corresponding to a set of necessary data which must be collected from at least one component when a stimulus is detected, where the collection of a set of necessary data from at least one component implies that a verbosity level of said at least one component is configured;

a computer enabling operations to be made on data from logs transmitted by a plurality of components in a data network, including:

at least one operation to correlate the events included in the logs generated by at least one component in a given time window, in order to deduce at least one stimulus from them;

at least one operation to compare at least one deduced stimulus with a predefined stimulus;

at least one deduction of an instruction which must be sent to a component intended to modify its verbosity level in accordance with the result of the comparison and of the investigation scenario associated with the predefined stimulus.

BRIEF DESCRIPTION OF THE FIGURES

Other characteristics and advantages of the invention will be seen clearly on reading the detailed description below, with reference to the appended figures, which illustrate.

DESCRIPTION

Definitions

The components defined in the present description can be any entity enabling a set of functions to be performed. These maybe hardware components or application components. They may be a user workstation, a printer, a server, a switch, a router, a business application, a network application, an operating system, or alternatively a database, etc. The components can also be storage entities such as files or folders.

Rights management includes levels of accreditations, levels of access to files and folders in the network, and levels of access to components.

Figure 1:
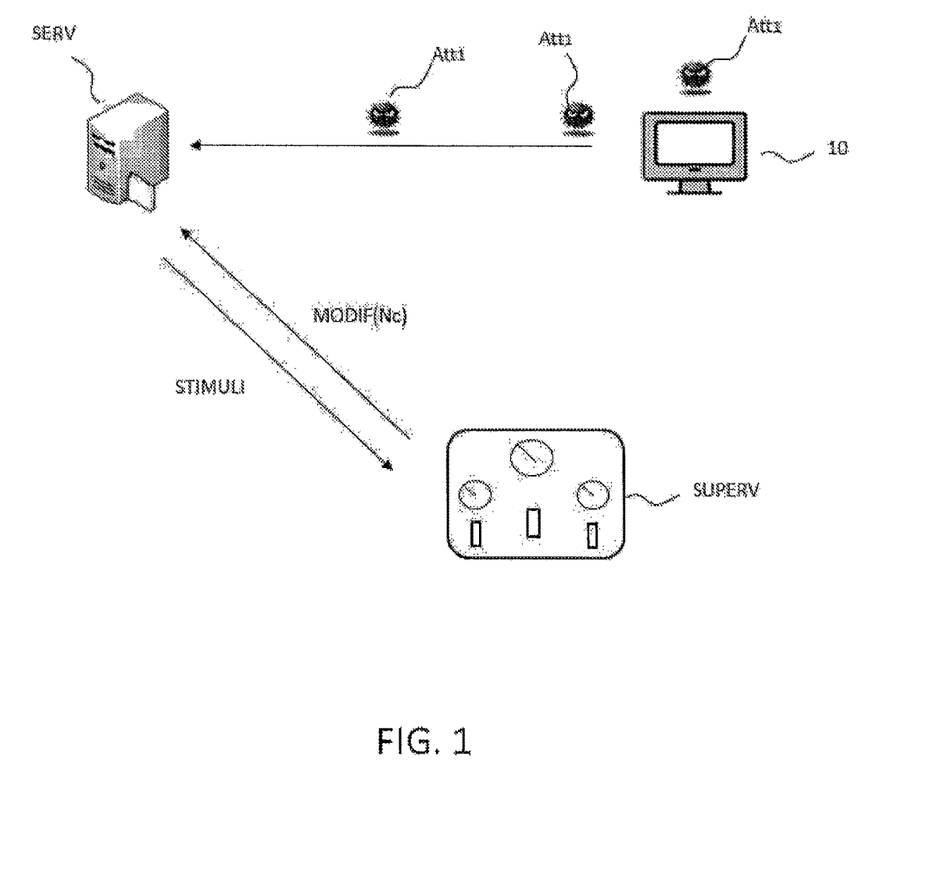
FIG. 1: an attack identified by a control centre of a server according to the method of the invention.

Introduction with FIG. 1

FIG. 1 represents a server SERV hosting various applications, each of which defines a component. FIG. 1 illustrates the transmission of an event such as an attack $Att_1$ made from a workstation 10, which may or may not be declared in the network. An attack may, for example, be an access to an unauthorised file or folder by workstation 10, or one which is not authorised by the rights of a user using workstation 10. Another attack may, for example, be a write command or command to extract data into a table of a database.

The attack is generally targeted on a component. With reference to the above two examples, this may be an attack on a file manager or an operating system, or on a database.

Each component settings whereby a verbosity level can be defined. The verbosity level defines the volume of logs generated by the component for events which are detected and sent to the control centre. When certain logs are generated relative to the events corresponding to attacks they can define a stimulus. According to the method of the invention stimulus may be determined or detected by a control centre SUPERV.

Although a stimulus may be detected, it is possible that the verbosity level assigned to a component does not allow generation of all the logs required for a remote investigation of the attack, its type, and other data enabling a thorough diagnosis to be made.

The method of the invention then enables a command noted MODIF(Nc) to be generated, the purpose of which is to modify the verbosity level of the component which has been attacked in order that a larger volume of logs may be generated for the purpose of improved diagnosis.

Verbosity Levels

Figure 2:
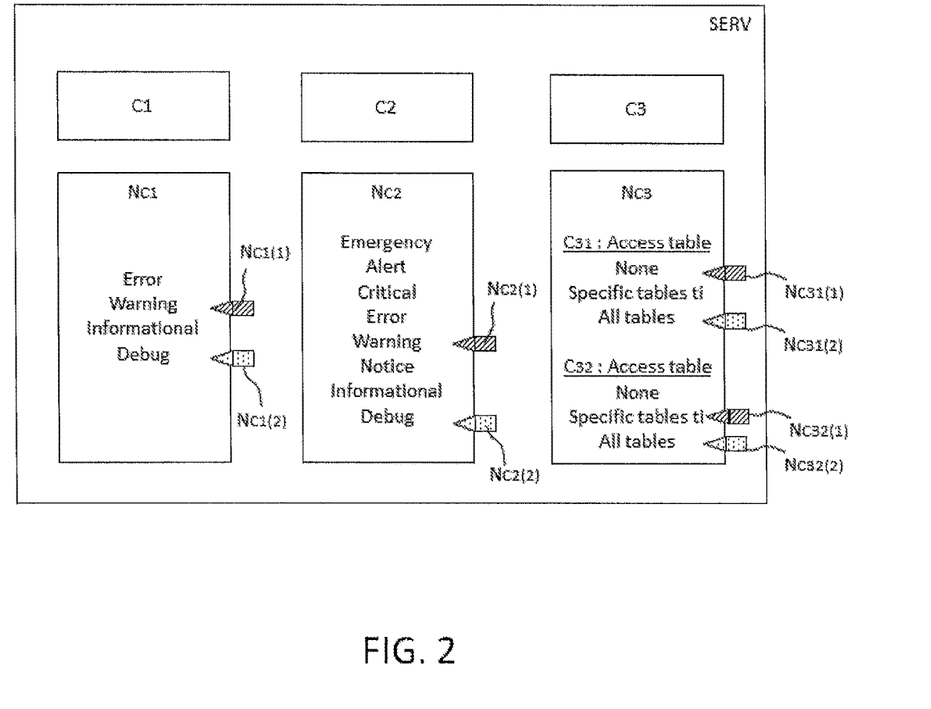
FIG. 2: a server with a plurality of components, the verbosity levels of the logs of which can be modified by means of the method of the invention.

FIG. 2 represents a server SERV including, for example, three components noted $C_1$, $C_2$ and $C_3$. The components can be, for example an antivirus program $C_1$, an operating system $C_2$ and a database $C_3$. Each component $C_1$, $C_2$ and $C_3$ includes settings defining a verbosity level of the component. FIG. 2 represents, as an example, various verbosity levels $N_{C1}(1)$, $N_{C1}(2)$, $N_{C2}(1)$, $N_{C2}(2)$, $N_{C31}(1)$, $N_{C31}(2)$, $N_{C32}(1)$, $N_{C32}(2)$, relative to components $C_1$, $C_2$ and $C_3$. The various verbosity levels of a component $C_p$, where p is the component's index, are noted $N_{Cp}(i)$, where i is an integer between 1 and the maximum number of verbosity levels defined for a given component $C_p$. The various verbosity levels existing in component $C_p$ can be defined by the supplier of the component, or by configuring the component in a given manner. They are often used to provide standardisation which can be implemented in different ways depending on the nature of the components.

As an example, first component $C_1$, which is an antivirus program, has 4 different verbosity levels: "Error", "Warning", "Informational" and "Debug". They are generally defined in English-language terminology, and define increasing degrees of verbosity.

As an example, verbosity level "Debug" means that all logs of all events which may occur within component $C_1$ are reported. Level "Error" means that certain type of events, corresponding to identified errors which may occur, are reported. Thus, when the verbosity level of component $C_1$ is at level "Warning", some logs are generated by component $C_1$, in particular logs for the more important type of event.

When control centre SUPERV detects a stimulus indicating the occurrence of an attack or of abnormal actions in a component, a command is generated so as to change the verbosity level of component $C_1$ to a higher verbosity level.

According to one implementation of the invention, control centre SUPERV can also generate a command intended to modify the verbosity level of a set of components $C_1$, $C_2$ and $C_3$ which are hosted, for example, on the same server SERV.

FIG. 2 represents arrows shown at the verbosity level in question when commands to change verbosity level are generated by control centre SUPERV, including in particular:

a change from a verbosity level of $N_{C1}(1)$ to degree $N_{C1}(2)$ of component $C_1$;

a change from a verbosity level of $N_{C2}(1)$ to degree $N_{C2}(2)$ of component $C_2$;

a change from a verbosity level of $N_{C31}(1)$ to degree $N_{C31}(2)$ of a part $C_{31}$ of component $C_3$;

a change from a verbosity level of $N_{C32}(1)$ to degree $N_{C32}(2)$ of a part $C_{32}$ of component $C_3$.

Sub-Components

A component $C_p$ may indeed include an architecture defining sub-components $(C_{pj})_{j\in[1;J_{max}]}$, where j is an index referring to a sub-component of component $C_p$, where the number of sub-components in a component $C_p$ is equal to $J_{max}$. The sub-components are also called parts of a component. This architecture is particularly suitable, for example, for databases which include different tables. Each table can have different security levels which require independent configuration from one table to the next in respect of the verbosity levels of the sub-components.

The method of the invention means that each sub-component may be considered to be a component, the verbosity level of which can be changed independently of the other sub-components of the same component.

Figure 3:
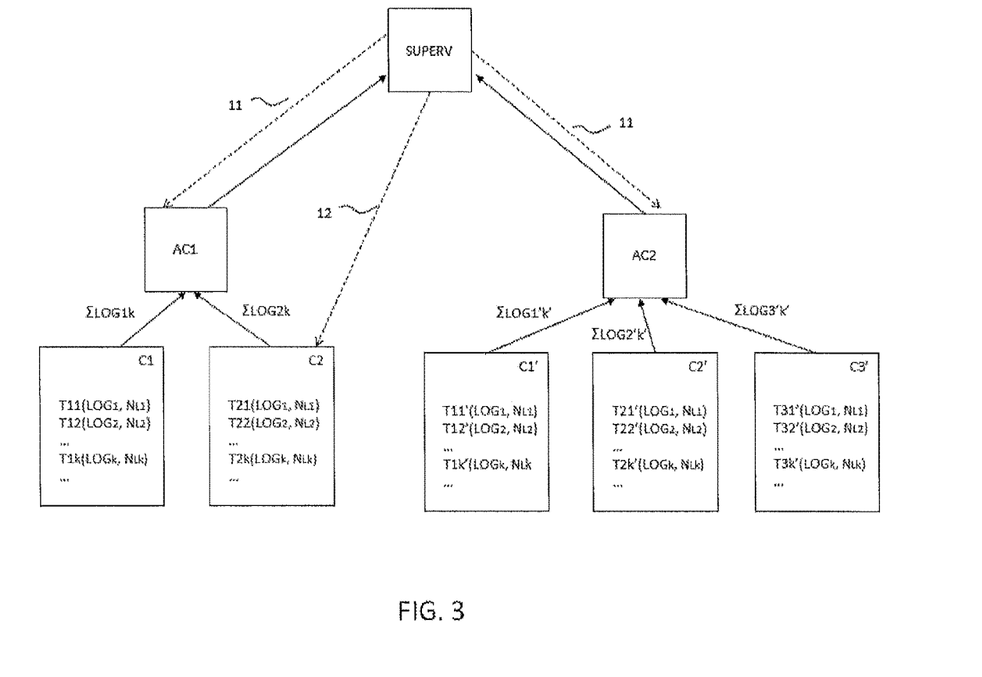
FIG. 3: an architecture containing agents able to collect logs generated by components through which it is possible to interface with a control centre.

FIG. 3 represents, in particular, a control centre SUPERV, of components $C_1$, $C_2$, $C_1'$, $C_2'$ and $C_3'$.

A set of components may be hosted on the same hardware, such as a server, a router or any device connected to the network supervised by control centre SUPERV.

Agents

In order to collect the logs transmitted by the components of a given set, agents $AC_1$, $AC_2$ can be configured to centralise the logs transmitted by each component.

As an example, FIG. 2 represents a server SERV containing a set of components. An agent can be hosted by this same server SERV, the function of which is to store the server's components and to collect the logs generated by each component.

According to one implementation, illustrated in FIG. 3, control centre SUPERV includes a network interface 11 with each agent $AC_1$, $AC_2$ so as to collect the logs transmitted by each component. According to one implementation, each agent enables the logs to be identified with the components from which they are obtained, and the logs to be organised according to predefined criteria. According to one implementation an agent may include additional data in the logs generated by the tasks executed within each component, or perform correlation operations between logs to generate criticality indicators, which are themselves reported to control centre SUPERV in the form of logs.

Alternatively, or in combination with the previous implementations, according to one implementation control centre SUPERV includes certain interfaces 11 with agents and other interfaces 12 directly with components, for example with a component $C_2$, as illustrated in FIG. 3.

According to various compatible cases of the invention, an implementation enables an agent to be defined in a component or a device hosting the component. A second implementation enables a remote agent to be defined, for example one dedicated to collecting logs from various components hosted on various devices. This may be the case when a component includes tasks which are distributed across the network on various devices.

Generation of LOGs

When a log is generated after a task has been executed there are various possible implementations to perform the method of the invention.

According to a first implementation the logs are recorded in a file of the component or a file of the device hosting the component. In the latter case it is also said that the logs are sent to a remote file. In this case agent $AC_1$ or $AC_2$ or control centre SUPERV accesses the file to extract the logs recorded in it from it.

According to another implementation the logs are sent to a remote agent hosted, for example, on a device other than the component generating the logs in question.

The various implementations may be combined, for example when the network includes various components which are configured differently.

Stimulus=1 LOG

The method of the invention includes a step intended to identify a stimulus. This step may be performed by a component, an agent located on the same device as the component, or a remote agent, or alternatively directly by control centre SUPERV.

According to a first implementation, a stimulus is the identification of a given log which has been generated by a given component, According to one example, control centre SUPERV receives a log from a given component or from a given agent where the log indicates that a given event has occurred in the component. Control centre SUPERV is able to identify this event, or to identify the log directly. In addition, control centre SUPERV identifies the component, the device hosting the component and, if applicable, the agent which collected the log. According to one implementation the control centre identifies a chain of different components. In this latter case a suspect event occurring in a component can allow an analysis of a set of components which may be affected by an anomaly or an attack. The method of the invention may then include a step intended to modify the verbosity level of a set of components.

According to one implementation the control centre associates with each event a scenario for investigating the error, the attack or the anomaly relating to the reported event, The investigation scenario includes an analysis of a number of logs of the component, in order to identify a cause. When, in its investigation scenario, control centre SUPERV identifies the verbosity levels of the logs it requires to start its analysis these may lead it to deduce a necessary maximum verbosity level which must be changed in the component. When the verbosity level has been identified the control centre generates a command to modify the verbosity level of the component in question according to the method of the invention. The component's verbosity level is changed such that the logs required for the analysis are generated and sent to the control centre.

Thus, depending on whether a given event does or does not occur, the method of the invention can modify the component's verbosity level dynamically.

As an example according to one implementation, the control centre includes a database storing the types of event which may occur for a given component or a given agent, and associates with it a verbosity level which must be applied to the component if the event occurs.

Stimulus=Result of a Correlation

According to another implementation the stimulus is identified after operations to correlate logs which are generated. According to the envisaged implementation of the invention these correlation operations can be undertaken by:

- the component itself: the component then transmits an indicator to an agent or to the control centre giving the result of the correlation. The indicator can itself be included in a particular log. This result can then define a stimulus depending on its value;
- the agent which collects logs from different components: the agent can then correlate logs from a given component, or alternatively logs transmitted from various components, for example when a joint attack on various components occurs;
- the control centre: which collects all the logs, either sent directly by the components, or by intermediate agents, or alternatively by both.

One advantage of detecting a stimulus from operations to correlate received logs is that it is possible to identify, for example, attacks over given time windows, or alternatively joint attacks on various network components.

FIG. 3 shows various tasks $T_{pk}(LOG_{pk}, N_{Lk})$ which may be executed within each component $C_p$. Index "p" enables the component to be named, and the index "k" enables task undertaken in component $C_p$ to be designated.

Each task $T_{pk}(LOG_{pk}, N_{Lk})$ generates a log $LOG_{pk}$. Logs $LOG_{pk}$ generated in this manner are sent after a step of detailed comparison below, when a local level $N_{Lk}$ of the task or log is higher than verbosity level $N_{Cp}$ of component $C_p$.

It will be understood that agents $AC_1$ and $AC_2$ collect only logs which have been sent by the components to which the agents are attached.

According to one implementation, control centre SUPERV includes an inventory of predefined stimuli, where each stimulus is associated with a combination of events which may occur within a given component over a given time period.

As an example, the writing of a value in a table of a database defines a first event, and a change to its configuration defines a second event, These two events, when they occur within the same given time period, by the same user, may match a predefined stimulus.

Control centre SUPERV is able to detect these two events as a stimulus when logs have been sent.

Main Steps of the Method

Figure 4A:
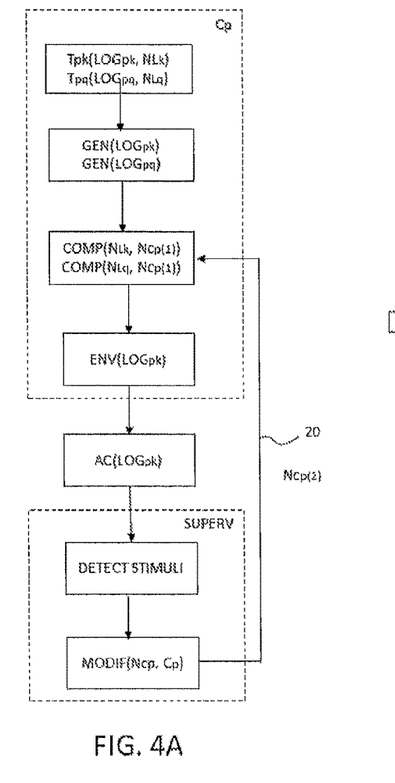
FIGS. 4A and 4B: the main steps of the method used to modify a verbosity level of a component, and to return it to normal.

FIG. 4A represents the main steps of the method of the invention when control centre SUPERV detects a stimulus.

Component $C_p$ includes a set of tasks $T_{pk}(LOG_{pk}, N_{Lk})$, where p refers to the component and k a task of component $C_p$. For example, component $C_1$ therefore includes tasks $T_{1k}(LOG_{1k}, N_{Lk})$. Each task $T_{1k}$ contains the definition of at least one log $LOG_{1k}$ and one local level $N_{Lk}$ which is associated with it. When the tasks are executed, for example a task intended to open a given file, an associated log is then generated. Local level $N_{Lk}$ of task $T_{1k}$ or of associated log $LOG_{1k}$ is compared to the component's verbosity level, such that the log in question may or may not be sent to:
- an agent $AC_x$, where "x" is the index referencing the agent, or;
- control centre SUPERV, or alternatively;
- a local file.

Figure 4B:
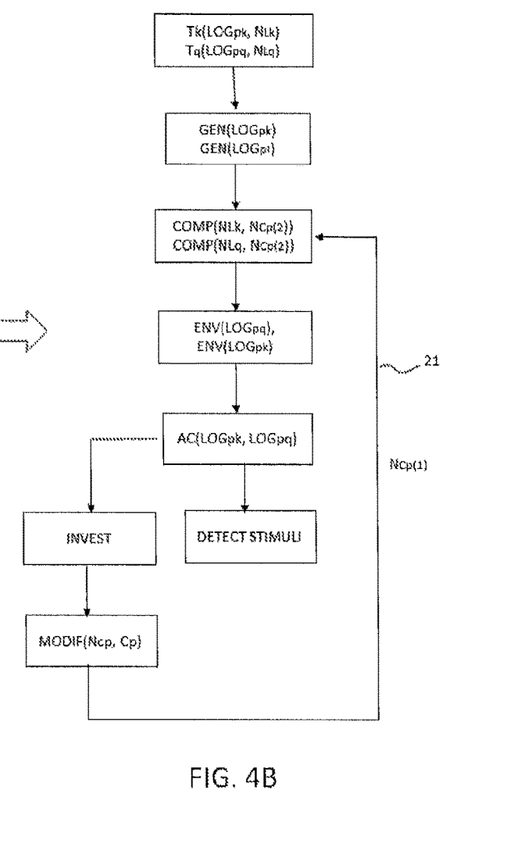

The operation intended to compare the verbosity level of a given log $LOG_{pk}$ transmitted by a component $C_p$ and the verbosity level of associated component $C_p$ in order to decide whether or not to send a LOG is named $COMP(N_{Lk}, N_{Cp})$ in FIGS. 4A and 4B.

The operation to generate a log $LOG_{pk}$ is named GEN($LOG_{pk}$) in FIGS. 4A and 4B. The operation to send a log $LOG_{pk}$ to a local file in order to record it, or an agent $AC_x$, or alternatively control centre SUPERV, is named ENV ($LOG_{pk}$) in FIGS. 4A and 4B.

In the example of FIGS. 4A, 4B an agent collects the logs sent and generated by the tasks executed in each component. This collection of logs by the agent is named $AC_x(LOG_{pk})$, where x is the index referencing the agent in question.

Using the collection of the logs of agent AC, Control centre SUPERV can identify stimuli: either spontaneously, if it receives a particular log, or by performing correlation operations between logs received over a time window, or by comparing logs transmitted from various components.

The function which enables the stimulus to be detected is named DETECT STIMULI in FIGS. 4A and 4B.

When a stimulus is detected the control centre is able to generate a new verbosity level which will be attributed to component $C_p$. To accomplish this, as seen above, control centre SUPERV can associate an investigation scenario with an event relating to the detection of the stimulus. This association enables an appropriate verbosity level to be generated, in order to perform an analysis of the logs of the component in which the event has occurred.

It is also possible for control centre SUPERV to modify verbosity levels of various components, in order to investigate the causes of the occurrence of one or more identified events.

FIG. 4A includes an arrow 20 indicating that the verbosity level change function has been started by control centre SUPERV for component $C_p$.

In addition to the sequence of events of FIG. 4A, FIG. 4B represents steps taken after the change of verbosity level $N_{Cp}(1)$, having become $N_{Cp}(2)$, where $N_{Cp}(2) > N_{Cp}(1)$ of component $C_p$.

After the verbosity level has been changed a larger number of logs is transmitted to control centre SUPERV, either directly or via the agent. As an example, log $LOG_{pq}$ associated with task $T_{pq}$ is then transmitted after the verbosity level of component Cp has been changed, whereas it had been filtered out before the change in this example. The number of logs is equal to the logs transmitted by tasks the logs of which have verbosity levels higher than the new verbosity level of component $C_p$. Control centre SUPERV can then start an investigation step, called INVEST, to deduce from them the causes of the occurrence of the event(s) which occurred within component $C_p$, by analysing the logs which have been reported.

When this investigation INVEST is completed, either by an end action applied by control centre SUPERV, or after the elapse of a first time period $T_1$, which may for example be predefined, then a new function to modify the verbosity level is started in order to return to default level $N_{Cp}(1)$. In this example this action 21 is initiated by control centre SUPERV. According to another example it could be applied automatically by the component itself.

According to one implementation of the invention, first given period $T_1$ is equal to a time interval during which no threat from component $C_p$ has been identified by control centre SUPERV after the verbosity level of component $C_p$ changed.

Performance Parameter

According to one implementation, the control centre takes account of at least one performance parameter to generate a new verbosity level after detecting a stimulus. For example, when the network is small, typically with limited bandwidths, the value of the new verbosity level can be changed to prevent the bandwidth becoming congested by generating too many logs.

According to this implementation, control centre SUPERV can execute a function taking into account an investigation scenario identified from a stimulus, and at least one performance parameter relating to a value of the component. For example, if the component is an application of a mobile terminal connected to the network via a small bandwidth the new verbosity level may remain unchanged compared to the component's current verbosity level, or it may be weighted in accordance with the performance parameter taken into account.

Control centre SUPERV may include an inventory of the supervised components in the network, each of which is associated with at least one value relating to performance parameter, such as a value representing a bandwidth, for example. According to another example, the performance parameter is a performance value of the component. Typically, if the component uses many resources, control centre SUPERV may weight the value of the new verbosity level which will be attributed to a component so as not to affect adversely the performance of said component. The performance value may be defined, for example, by a number of events processed by the component over a predefined period.

The invention claimed is:

1. A method for dynamic management of at least a first verbosity level of at least one component defined in a data network, wherein said data network has a control centre, and wherein each component allows execution of a set of tasks, and has a security management configuration associating a status message forming a log, with execution of a task of said component, wherein each log associated with a task indicates at least one event, and has a local level, wherein the control centre collects a set of logs for supervision of said network, said method comprising:
    detecting a stimulus by a control centre;
    determining at least one component associated with the stimulus detected by the control centre; and
    performing a first change of the first verbosity level of said component to a second verbosity level during a first given period, wherein said first change is effected by the control centre generating a supervision command, and wherein the second verbosity level is defined according to the detected stimulus.

2. The method for dynamic management of at least a first supervision level according to claim 1, wherein after the first period has elapsed the method includes:
    performing a second change of the second verbosity level of the first component, to return to the first verbosity level.

3. The method for dynamic management of at least a first verbosity level according to claim 1, wherein the control centre includes a memory in which the following are stored:
    a set of components in the network, and for each component a first premier verbosity level associated with it;
    a set of investigation scenarios including predefined stimuli, wherein each predefined stimulus is associated with a recommended verbosity level.

4. The method for dynamic management of at least a first verbosity level according to claim 3, wherein the value of the second verbosity level is generated according to:
    an investigation scenario identified according to a determined stimulus, wherein a determined stimulus includes at least one event identified by a received log;
    a performance value of a component associated with a log used in determining the stimulus.

5. The method for dynamic management of at least a first verbosity level according to claim 3, wherein the stimulus is the result of:
    at least one operation to correlate a set of events occurring in a given time window, reported by generating a set of logs of at least one component;
    a comparison of the result of the operation to correlate collected logs with all the investigation scenarios stored in the control centre.

6. The method for dynamic management of at least a first verbosity level according to claim 3, wherein an investigation scenario and a correlation operation leading to the determination of a stimulus take the following into account:
    a plurality of events identified by logs occurring over a given period;
    one or a plurality of component(s) associated with at least one event;
    an identification of at least one device.

7. The method for dynamic management of at least a first verbosity level according to claim 1, wherein at least one agent storing a set of components is configured to collect the logs generated from a plurality of components, wherein the agent transmits the collected logs to the control centre.

8. The method for dynamic management of at least a first verbosity level according to claim 1, wherein a log includes at least one of the following elements:
    a date when an event relating to the executed task occurred;
    an identifier of at least one user;
    an identifier of at least one component;
    a category or criticality.

9. The method for dynamic management of at least a first verbosity level according to claim 1, wherein a log is sent to the control centre by a task when its local level is higher than the component's verbosity level.

10. The method for dynamic management of at least a first verbosity level according to claim 9, wherein each generated log is stored in a local file of the component or transmitted to an agent or transmitted to the network's control centre.

11. The method for dynamic management of at least a first verbosity level according to claim 1, wherein the second verbosity level of the component is between the first verbosity level of the component and the maximum possible verbosity level of a component, wherein the second verbosity level depends on the determined stimulus.

12. The method for dynamic management of at least a first verbosity level according to claim 1, wherein a component is an application component from the following list:
    a driver;
    a local agent of a computer hardware device;
    a database;
    a business application;
    an operating system;
    a network application;
    a firmware module;
    an anti-virus module;
    a firewall;
    an agent of a hardware component.

13. The method for dynamic management of at least a first verbosity level according to claim 1, wherein an event which may occur and generate a log is in the following list:
    a command given by a function of a given component;
    generation of a result of a function executed following a command;
    access to, opening, closure or modification of a given file or folder;
    a determined number of simultaneous connections to a component;
    a given query with a given IP address;
    access to a given interface of the component;
    a reboot of the component;
    disconnection of the component.

14. A control centre for dynamic management of at least one verbosity level of at least one component of a data network, the control center comprising:
    a network interface to log into a data network and to collect data transmitted by at least one component in the network;
    a memory allowing storage of:
        a set of stored components in the data network, wherein each component enables execution of a set of tasks, wherein each task may generate a log in the network, wherein each log corresponds to a given event;

predefined stimuli, wherein each stimulus corresponds to a least one event, or to the result of correlations of events occurring within a time window;

investigation scenarios corresponding to a set of necessary data to be collected from at least one component when a stimulus is detected, wherein the collection of a set of necessary data from at least one component implies that a verbosity level of said at least one component is configured;

a computer enabling operations to be made on data from logs transmitted by a plurality of components in a data network, including:

at least one operation to correlate the events included in the logs generated by at least one component in a given time window, in order to deduce at least one stimulus from them;

at least one operation to compare at least one deduced stimulus with a predefined stimulus;

at least one deduction of an instruction to be sent to a component intended to modify its verbosity level in accordance with the result of the comparison and of the investigation scenario associated with the predefined stimulus.

* * * * *